United States Patent
Facchinetti

(10) Patent No.: US 11,841,229 B2
(45) Date of Patent: *Dec. 12, 2023

(54) DRIVING CIRCUIT, METHOD FOR DRIVING A MEMS GYROSCOPE AND A CORRESPONDING MEMS GYROSCOPE

(71) Applicant: STMicroelectronics S.r.l., Agrate Brianza (IT)

(72) Inventor: Stefano Facchinetti, Caponago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 379 days.

This patent is subject to a terminal disclaimer.

(21) Appl. No.: 17/179,225

(22) Filed: Feb. 18, 2021

(65) Prior Publication Data

US 2021/0172738 A1    Jun. 10, 2021

Related U.S. Application Data

(63) Continuation of application No. 16/123,849, filed on Sep. 6, 2018, now Pat. No. 10,955,244.

(30) Foreign Application Priority Data

Sep. 14, 2017    (IT) .................. 102017000103058

(51) Int. Cl.
*G01C 19/5776* (2012.01)
*G01C 19/5712* (2012.01)

(52) U.S. Cl.
CPC ..... *G01C 19/5776* (2013.01); *G01C 19/5712* (2013.01)

(58) Field of Classification Search
CPC ............ G01C 19/5776; G01C 19/5712; G01C 19/5649; G01C 19/5656
See application file for complete search history.

(56) References Cited

U.S. PATENT DOCUMENTS 10,955,244 B2 * 3/2021 Facchinetti ........ G01C 19/5712
2004/0088127 A1    5/2004 M'Closkey et al.
(Continued)

OTHER PUBLICATIONS

Northemann et al., "Controlling the Primary Mode of Gyroscopes with a Phase-Based Amplitude Regulation," 2011 Proceedings of the ESSCIRC (ESSCIRC), Sep. 12-16, 2011, pp. 295-298.

*Primary Examiner* — David Z Huang
(74) *Attorney, Agent, or Firm* — SEED IP LAW GROUP LLP

(57) ABSTRACT

A driving circuit for a microelectromechanical system (MEMS) gyroscope operating based on the Coriolis effect is provided. The driving circuit supplies drive signals to a mobile mass of the MEMS gyroscope to cause a driving movement of the mobile mass to oscillate at an oscillation frequency. The driving circuit includes an input stage, which receives at least one electrical quantity representing the driving movement and generates a drive signal based on the electrical quantity; a measurement stage, which measures an oscillation amplitude of the driving movement based on the drive signal; and a control stage, which generates the drive signals based on a feedback control of the oscillation amplitude. The measurement stage performs a measurement of a time interval during which the drive signal has a given relationship with an amplitude threshold, and measures the oscillation amplitude as a function of the time interval.

18 Claims, 4 Drawing Sheets

(56) References Cited

U.S. PATENT DOCUMENTS

| | | |
|---|---|---|
| 2009/0217757 A1 | 9/2009 | Nozawa |
| 2013/0055815 A1* | 3/2013 | Yanagisawa ....... G01C 19/5649 73/579 |
| 2016/0231117 A1* | 8/2016 | Lloyd ................ G01C 19/5776 |
| 2017/0097245 A1 | 4/2017 | Geiger |

* cited by examiner

DRIVING CIRCUIT, METHOD FOR DRIVING A MEMS GYROSCOPE AND A CORRESPONDING MEMS GYROSCOPE

BACKGROUND

Technical Field

The present invention relates to a driving circuit and a driving method for a MEMS gyroscope, in particular a MEMS gyroscope operating on the basis of the Coriolis effect, the so-called CVG (Coriolis Vibrating Gyroscope). The present invention further relates to a corresponding MEMS gyroscope.

Description of the Related Art

As is known, current micromachining techniques enable microelectromechanical systems (MEMS) to be obtained starting from layers of semiconductor material, which have been deposited (e.g., a layer of polycrystalline silicon) or grown (e.g., an epitaxial layer) on sacrificial layers, which are then removed via chemical etching. Inertial sensors, in particular accelerometers and gyroscopes, obtained with this technology are encountering a growing success, for example in the automotive field, in inertial navigation, and in the field of portable devices.

In particular, integrated gyroscopes of semiconductor material made using MEMS technology are known, operating on the basis of the relative-acceleration theorem, exploiting Coriolis acceleration. As previously mentioned, these MEMS gyroscopes are referred to as CVGs.

When a rotation at a certain angular velocity (the value of which is to be detected) is applied to a mobile mass (the so-called inertial mass) of the MEMS gyroscope, which is driven at a linear velocity, the inertial mass feels an apparent force, defined as the Coriolis force, which determines a displacement thereof in a direction perpendicular to the direction of the driving linear velocity and to the axis about which the rotation occurs.

The inertial mass is supported via elastic elements that enable its displacement in the direction of the apparent force. On the basis of Hooke's law, the displacement is proportional to the apparent force, so that from the displacement of the inertial mass it is possible to detect the Coriolis force and thus the value of the angular velocity of the rotation that has generated it.

The displacement of the inertial mass may, for example, be detected capacitively, determining, in a condition of resonance oscillation (so as to maximize the amplitude of the movement), the variations of capacitance caused by the movement of mobile sense electrodes, which are fixed with respect to the inertial mass and are capacitively coupled to fixed sense electrodes (for example, in the so-called "parallel-plate" configuration, or else in the so-called "comb-fingered" configuration).

FIG. 1 shows schematically, and purely by way of example, a possible embodiment of a known type of a MEMS CVG, designated as a whole by 1, in this case of the uniaxial type, i.e., being able to detect an angular velocity, for example an angular velocity $\Omega_z$, acting along a single sensing axis, in the example acting about a vertical axis z.

The MEMS gyroscope 1 comprises a micromechanical structure 1' having a driving mass 2, with main extension in a horizontal plane xy. The driving mass 2 is coupled to a substrate S (illustrated schematically) via anchorages 3, to which it is connected by elastic anchorage elements 4, which are configured to enable a driving movement of the driving mass 2 along a first horizontal axis x of the aforesaid horizontal plane xy.

Drive electrodes 5 and drive-sense electrodes 6 are coupled to the driving mass 2 and include respective mobile electrodes, coupled to the driving mass 2, and respective fixed electrodes, fixed with respect to the substrate, the mobile electrodes and the fixed electrodes being capacitively coupled in the so-called comb-fingered configuration.

The drive electrodes 5 are biased by drive (or excitation) signals $D_1$, $D_2$ so as to generate, as a result of the electrostatic coupling between the respective mobile electrodes and the respective fixed electrodes, the aforesaid driving movement of the driving mass 2, in particular a resonant movement at an oscillation frequency $f_d$ (which corresponds to the natural frequency of oscillation of the micromechanical structure 1'), and the drive-sense electrodes 6 enable generation of drive signals $I_1$, $I_2$, in particular capacitive-variation signals indicative of the extent of the driving movement, i.e., of the amplitude of oscillation of the driving mass 2. The drive signals $I_1$, $I_2$ are advantageously of a differential type, i.e., having opposite variations in response to the driving movement. As illustrated in FIG. 1, a first set of drive-sense electrodes, designated by 6', is in fact configured to generate a first capacitive variation, due to the driving movement, and a second set of drive-sense electrodes, designated by 6", is configured to generate a second capacitive variation, opposite to the first capacitive variation, due to the same driving movement.

The micromechanical structure 1' of the MEMS gyroscope 1 further comprises an inertial mass 8, elastically coupled to the driving mass 2, by elastic coupling elements 9, configured so that the inertial mass 8 is fixedly coupled to the driving mass 2 during the driving movement, thus being drawn along the first horizontal axis x, and is further free to move in a sensing movement along a second horizontal axis y of the horizontal plane xy, orthogonal to the first horizontal axis x, as a result of the Coriolis force that is generated in the presence of the angular velocity $\Omega_z$ acting about the vertical axis z, orthogonal to the aforesaid horizontal plane xy.

Sense electrodes 10 are coupled to the inertial mass 8, capacitively coupled together in comb-fingered configuration, in part coupled to the inertial mass 8 and in part fixed with respect to the substrate so as to generate differential capacitive variations due to the sensing movement.

The sense electrodes 10 thus enable generation of sense signals $V_{s1}$, $V_{s2}$, in particular capacitive-variation signals representing the extent of the sensing movement, i.e., the amplitude of the oscillation of the inertial mass 8 along the second horizontal axis y, which may be appropriately processed for determining the value of the angular velocity $\Omega_z$ to be detected.

In particular, the MEMS gyroscope 1 comprises: a sense, or read, circuit 12, coupled to the sense electrodes 10 and configured to generate an output signal, for example an output voltage $V_{out}$, as a function of the sense signals $V_{s1}$, $V_{s2}$; and a driving circuit 14, coupled to the drive electrodes 5 and to the drive-sense electrodes 6 and configured to generate the drive signals $D_1$, $D_2$ by a feedback control based on the drive signals $I_1$, $I_2$ and a desired oscillation amplitude of the drive mode (the value of this amplitude being determined at the design stage so as to ensure the desired sensitivity in the detection of angular velocities).

Indeed, it is known that the oscillation amplitude of the drive mode in the MEMS gyroscope 1 is to be accurately controlled, given that its value directly determines the sensitivity characteristics of the sensor in the detection of angular velocities.

It should be noted that the driving mass 2 and the inertial mass 8 are biased at a constant voltage, designated by $V_{ROT}$ in FIG. 1 and in the subsequent figures.

In greater detail and as illustrated in FIG. 2, the driving circuit 14, in an embodiment of a known type, has: a first input 14a and a second input 14b, configured to receive the aforesaid drive signals $I_1$, $I_2$; and a first output 14c and a second output 14d, configured to supply the aforesaid drive signals $D_1$, $D_2$.

The driving circuit 14 comprises an input stage 15, which is coupled to the first input 14a and to the second input 14b and is configured to supply a drive signal $V_{SD}$, in particular a differential-voltage signal, as a function of the drive signals $I_1$, $I_2$. The input stage 15 is, in the example, a capacitance-to-voltage (C2V) converter, configured to generate, as a function of the capacitive-variation signals received at the input, and of corresponding current signals $i_{SD}$, a voltage signal at the output. Different embodiments may, however, be envisaged for the aforesaid input stage 15, which could, for example, comprise a transimpedance amplifier.

In particular, if the Barkhausen criteria is satisfied for the drive loop, the drive signal $V_{SD}$ is a sinusoidal signal at the natural oscillation frequency $f_d$ of the driving section of the micromechanical structure 1' of the MEMS gyroscope 1.

The driving circuit 14 further comprises: a comparator stage 16, which receives at its input the drive signal $V_{SD}$ and generates at its output (by zero-crossing detection) a clock signal ck at the oscillation frequency $f_d$ (referred to as "natural clock"); and a PLL (Phase-Locked Loop) stage 17, which receives at its input the natural clock signal ck and generates at its output an appropriate number of derived clock signals $\overline{ck}$, at frequencies that are appropriately linked to the oscillation frequency $f_d$ and which are used in a known manner within the MEMS gyroscope 1, for example for the operations performed by the same driving circuit 14 and sensing circuit 12.

The driving circuit 14 further comprises an automatic-gain control (AGC) stage 18, which receives at the input the drive signal $V_{SD}$ and a reference signal $V_{ref}$, which is indicative of the desired (or by-design) oscillation amplitude of the drive mode.

The AGC stage 18 generates, as a function of the drive signal $V_{SD}$ and of the reference signal $V_{ref}$, a control signal $V_{ctrl}$, which is a function of the difference between the same drive signal $V_{SD}$, for example between its peak value, and the reference signal $V_{ref}$.

The driving circuit 14 further comprises a forcing stage 19, which is coupled to the first output 14c and to the second output 14d of the driving circuit 14, further receives an appropriate derived clock signal $\overline{ck}$ from the PLL stage 17 and the aforesaid control signal $V_{ctrl}$ from the AGC stage 18, and is configured to generate the drive signals $D_1$, $D_2$ as a function of the same control signal $V_{ctrl}$.

The driving circuit 14 thus implements a feedback control so as to force the value of the drive signals $D_1$, $D_2$ to be such as to cause the drive signal $V_{SD}$ to have a desired relation with the reference signal $V_{ref}$ (and so as to obtain, as a result, the desired oscillation amplitude of the driving movement).

The present Applicant has noticed that the aforesaid driving solution has some problems, at least in certain operating conditions.

In the first place, the AGC stage 18, by its purely analog nature, is affected in a non-negligible way by possible variations (mismatch) of the values of the circuit components, for example due to manufacturing process spread, ageing, or external parameters, such as temperature or humidity. Consequently, it is possible for undesirable variations to occur in the control of the amplitude of oscillation of the drive mode and, thus, undesirable variations of the detection sensitivity of the MEMS gyroscope 1 with respect to angular velocities.

Furthermore, once again due to the AGC stage 18 (which comprises, in a known way, amplification blocks that have to be appropriately biased), the driving circuit 14 has a considerable electrical consumption, which has a marked effect on the overall consumption of the MEMS gyroscope 1.

BRIEF SUMMARY

An improved driving solution for a MEMS gyroscope is provided.

According to the present solution, a driving circuit for a MEMS gyroscope and a corresponding driving method are consequently provided. A driving circuit for a MEMS gyroscope is provided. The driving circuit includes an input stage configured to receive at least one electrical quantity indicative of a driving movement of a mobile mass of the MEMS gyroscope, and generate at least one drive signal based on the electrical quantity. The driving circuit includes a measurement stage configured to determine a duration of a time interval in which the drive signal satisfies a given relationship with an amplitude threshold, and determine an oscillation amplitude of the driving movement based on the duration of the time interval. The driving circuit includes a control stage configured to receive the oscillation amplitude, generate drive signals for a mobile mass of the MEMS gyroscope based on the oscillation amplitude, and supply the drive signals to the mobile mass of the MEMS gyroscope to cause the driving movement to be at an oscillation frequency.

BRIEF DESCRIPTION OF THE SEVERAL VIEWS OF THE DRAWINGS

For a better understanding of the present invention, preferred embodiments thereof are now described, purely by way of non-limiting example and with reference to the attached drawings, wherein.

DETAILED DESCRIPTION

As will now be discussed in detail, an aspect of the present application envisages measuring the oscillation amplitude of the driving movement by a time-domain measurement of a substantially digital nature, in particular based on measurement of a time interval during which the drive signal $V_{SD}$ (see the foregoing discussion) has a given relation with an appropriate amplitude threshold.

The drive signal $V_{SD}$, of a sinusoidal type, which, as it has been discussed previously, represents the main vibration mode associated to the driving movement, may be expressed as:

$$V_{SD} = A_0 \sin(2\pi f_d t)$$

where $f_d$, as mentioned previously, is the oscillation frequency, and $A_0$ is the oscillation amplitude of the driving movement.

Figure 3:
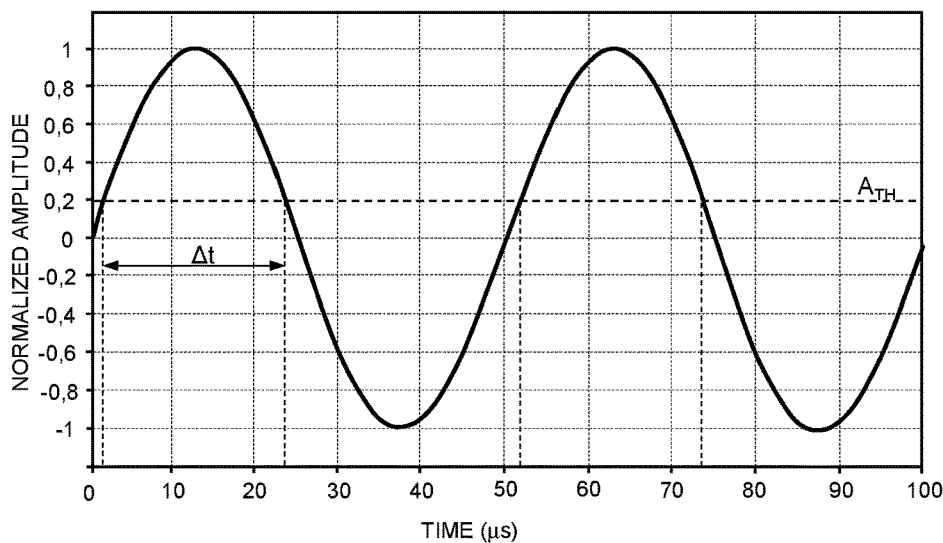
FIGS. 3-6 show plots of electrical quantities of a driving circuit of a MEMS gyroscope according to the embodiments described herein.

Referring also to FIG. 3, it may be shown that the time interval $\Delta t$ during which the drive signal $V_{SD}$ is greater than an amplitude threshold $A_{th}$ may be expressed as:

$$\Delta t = \frac{T_d}{2} - 2\frac{1}{2\pi f_d}\sin^{-1}\left(\frac{A_{th}}{A_0}\right) = \frac{1}{f_d}\left[\frac{1}{2} - \frac{1}{\pi}\sin^{-1}\left(\frac{A_{th}}{A_0}\right)\right]$$

where $T_d$, equal to $1/f_d$, is the period of the natural oscillation of the driving mass, and the relation $0 < A_{th} < A_0$ applies (it should be noted that altogether similar considerations may be applied to a threshold of a negative value; also, it is possible to rectify the sinusoid, so as to have two measurements per oscillation period).

A well-defined relation between the time interval $\Delta t$ and the oscillation amplitude $A_0$ thus exists; in other words, the measurement of the time interval $\Delta t$ may be used to infer the oscillation amplitude $A_0$. However, this relation is in this case dependent upon the oscillation frequency $f_d$ of the driving movement, which, even though being a design parameter of the MEMS gyroscope 1, may be affected by manufacturing process spread, temperature variations or other factors.

An aspect of the present application thus envisages exploitation, for measurement of the time interval $\Delta t$, of a derived clock signal $\overline{ck}$, at a high frequency, which also depends on the oscillation frequency $f_d$ of the driving movement (i.e., on the natural frequency of the main oscillation mode).

In particular, for this derived clock signal $\overline{ck}$, the following relations apply:

$$f_{ck} = kf_d; \text{ and}$$

$$T_{ck} = \frac{1}{f_{ck}} = \frac{1}{kf_d}$$

where $f_{ck}$ is the frequency of the derived clock signal $\overline{ck}$, $T_{ck}$ is the period of the derived clock signal $\overline{ck}$, and k is an appropriate multiplicative factor that defines the value of the frequency $f_{ck}$ of the derived clock signal $\overline{ck}$ starting from the oscillation frequency $f_d$.

It is consequently possible to measure the duration of the time interval $\Delta t$ by the frequency $f_{ck}$ and obtain a correspondence between a count N, which indicates the number of periods $T_{ck}$ of the derived clock signal $\overline{ck}$ counted in the time interval $\Delta t$, and the oscillation amplitude $A_0$ of the driving movement. In particular, using the expressions given previously, the following relation may be obtained:

$$N = \frac{\Delta t}{T_{ck}} = \frac{f_{ck}}{f_d}\left[\frac{1}{2} - \frac{1}{\pi}\sin^{-1}\left(\frac{A_{th}}{A_0}\right)\right] = k\left[\frac{1}{2} - \frac{1}{\pi}\sin^{-1}\left(\frac{A_{th}}{A_0}\right)\right]$$

Basically, there is a well-defined relation between the count N (and the associated duration of the time interval $\Delta t$) and the oscillation amplitude $A_0$, or, in other words, it is possible to infer the value of the aforesaid oscillation amplitude $A_0$ starting from count N. In particular, this count N is in no way dependent upon the oscillation frequency $f_d$ (and the possible associated spread or variations).

A control of the driving action based on the aforesaid count N to infer the value of the oscillation amplitude $A_0$ may thus guarantee repeatability of the amplitude value and of the associated detection sensitivity of the MEMS gyroscope, even in the presence of possible process spread or variations of the operating parameters causing variations of the value of the driving frequency $f_d$.

Figure 4:
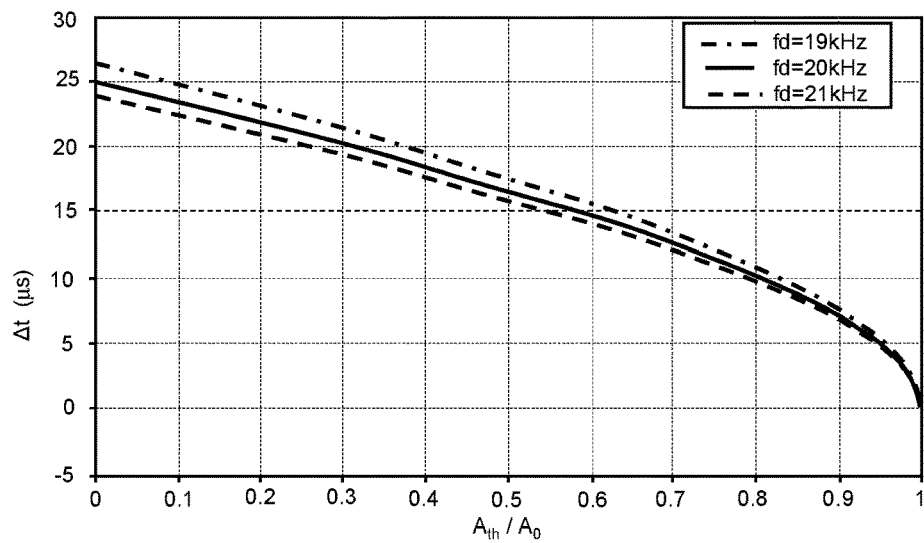
Figure 5:
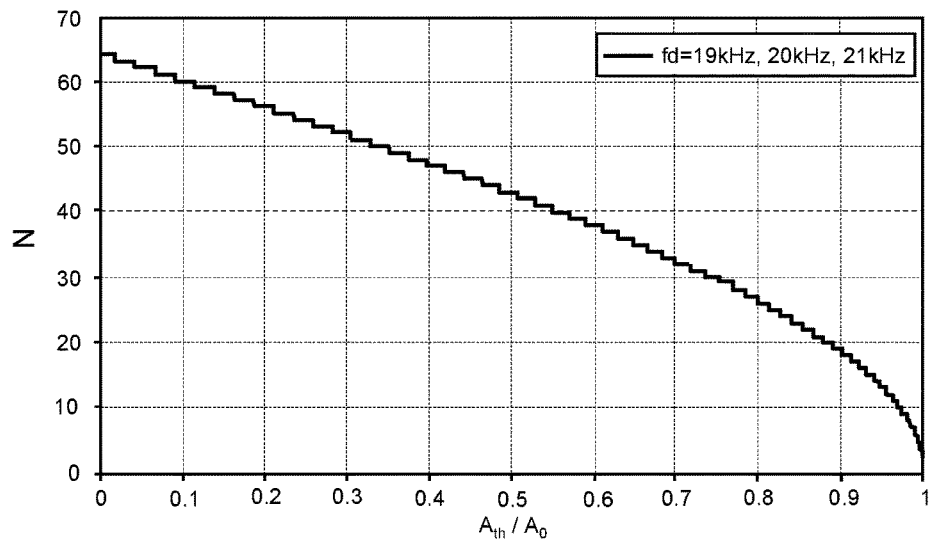

What has been previously discussed is confirmed by an analysis of the plots of FIGS. 4 and 5, obtained via simulation, which show, respectively, the plot of the time interval $\Delta t$ (FIG. 4) and of count N (FIG. 5), as a function of the ratio $A_{th}/A_0$ between the amplitude threshold $A_{th}$ and the oscillation amplitude $A_0$, at three different values of the oscillation frequency $f_d$, in the example, 19 kHz, 20 kHz, and 21 kHz. The value of the multiplicative factor k is, in the simulation, equal to 128, by way of example.

In particular, the aforesaid FIGS. 4 and 5 show that, as the oscillation frequency $f_d$ varies (in the example with a spread of approximately 5%, in line with what could be expected from technological spread in an illustrative process), a corresponding variation of the duration of the time interval $\Delta t$ occurs for a given value of the ratio $A_{th}/A_0$, whereas, instead, the count N remains absolutely unvaried.

Figure 6:
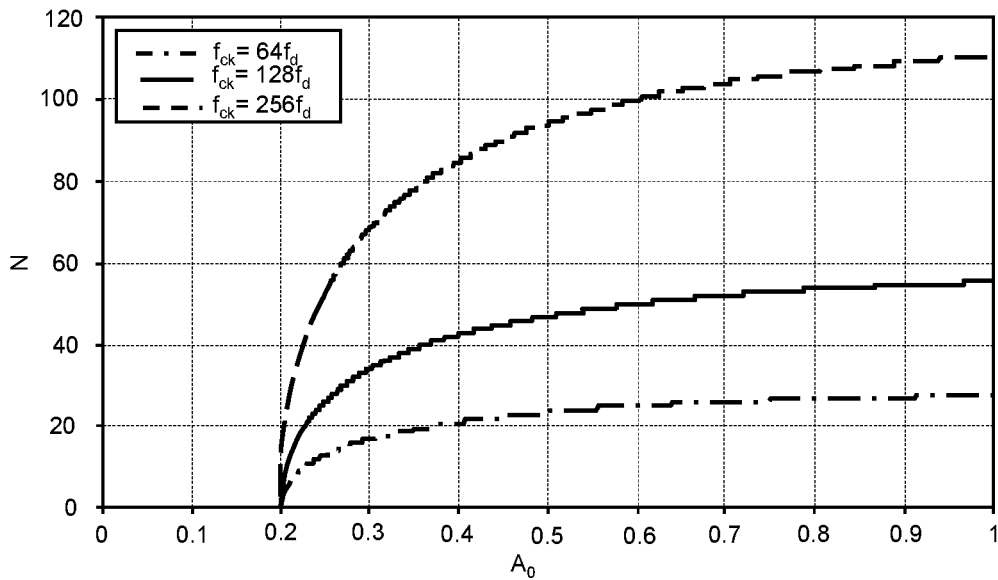

FIG. 6 further shows how the plot of count N varies as a function of the oscillation amplitude $A_0$, at three different values of the aforesaid multiplicative factor k and of the resulting frequency $f_{ck}$ (being 64, 128, or 256 times the oscillation frequency $f_d$), further assuming, by way of example, an amplitude threshold $A_{th}$ of 0.2 (it is to be noted that the amplitude values are normalized to 1).

In particular, FIG. 6 shows that the resolution is higher (or, equivalently, the quantization error is lower) for high values of the frequency $f_{ck}$ of the derived clock signal $\overline{ck}$ and in the case where the value of the amplitude threshold $A_{th}$ is close to the value of the oscillation amplitude $A_0$ of the drive signal $V_{SD}$.

It thus follows that, at the design stage, once the desired value of the oscillation amplitude $A_0$ has been set, in so far as it depends on the characteristics of the micromechanical structure and the desired detection sensitivity value for the MEMS gyroscope, it is possible to select an appropriate value for the amplitude threshold $A_{th}$ and the multiplicative factor k so as to define an optimal operating point for the driving circuit, to which optimal values of the corresponding electrical characteristics correspond. In this way, even small variations in the oscillation amplitude may advantageously be detected.

In particular, as previously mentioned, it is in general advantageous for the operating point to satisfy one or both of the following conditions: the ratio $A_0/A_{th}$ is low (e.g., less than 2); the multiplicative factor k is high (e.g., greater than 128).

Figure 7:
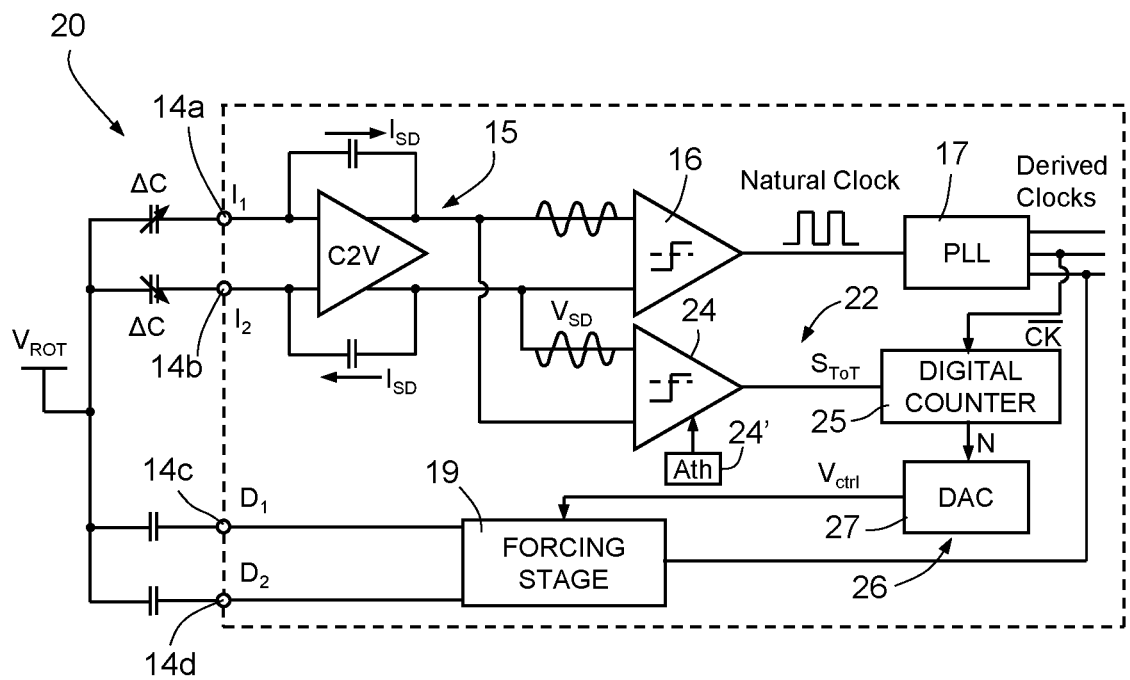
FIG. 7 is a block diagram of the driving circuit of the MEMS gyroscope according to a first embodiment.

With reference to FIG. 7, a description is now presented of a possible embodiment of a driving circuit, designated in this case by 20, for a MEMS gyroscope, which exploits the solution described previously for determining a measurement of the oscillation amplitude of the driving movement of a corresponding mobile mass, and implementing, based on this measurement of the oscillation amplitude, feedback control of the driving movement.

Figure 2:
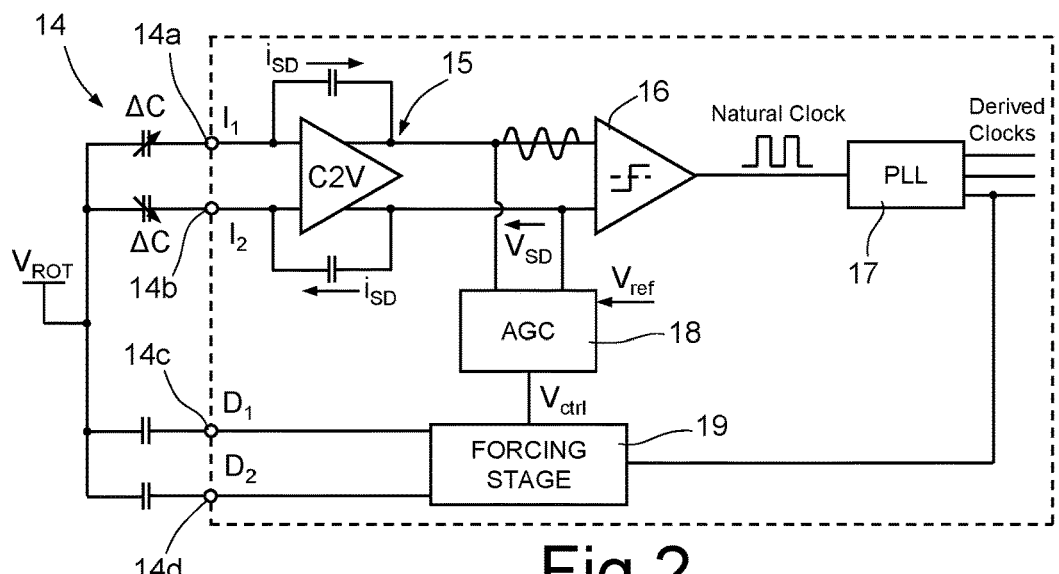
FIG. 2 is a general block diagram of a driving circuit of the MEMS gyroscope, which is also of a known type.

As it is clear from an examination of the aforesaid FIG. 7, the driving circuit 20 basically corresponds to the driving circuit 14 described with reference to FIG. 2; consequently, elements that are similar are designated by the same reference numbers and are not described in detail any further.

The driving circuit 20 differs in that the AGC stage 18 is absent and is in this case replaced by a measurement stage 22, configured to perform a measurement in the time domain, in a substantially digital manner, of the oscillation amplitude of the driving movement.

The above measurement stage 22 comprises a threshold-comparator block 24, which receives at its input the drive signal $V_{SD}$ generated by the input stage 15 and generates at its output a time-over-threshold signal $S_{ToT}$, i.e., a signal having a first value (e.g., a high value) if the drive signal $V_{SD}$ is higher than the amplitude threshold $A_{th}$ (the value of which is appropriately set, as discussed previously) and a second value (e.g., a low value), otherwise.

The threshold-comparator block 24 receives the amplitude threshold $A_{th}$ from a threshold-reference block 24', configured to generate the same amplitude threshold $A_{th}$ with a precise and stable value, via known circuits, such as bandgap circuits that supply a stable and, where used, adjustable voltage reference.

The measurement stage 22 further comprises a counter block 25, of a digital nature, coupled to the threshold-comparator block 24, from which it receives the time-over-threshold signal $S_{ToT}$, and further coupled to the PLL stage 17, from which it receives a derived clock signal $\overline{ck}$ at the frequency $f_{ck}$ (the value of which is appropriately set, as discussed previously). The counter block 25, enabled by the time-over-threshold signal $S_{ToT}$, is configured to determine the count N, i.e., the number of periods $T_{ck}$ of the derived clock signal $\overline{ck}$ within the time interval Δt; this count number N, as discussed previously, is directly proportional to the oscillation amplitude $A_0$ of the driving movement.

Figure 8:
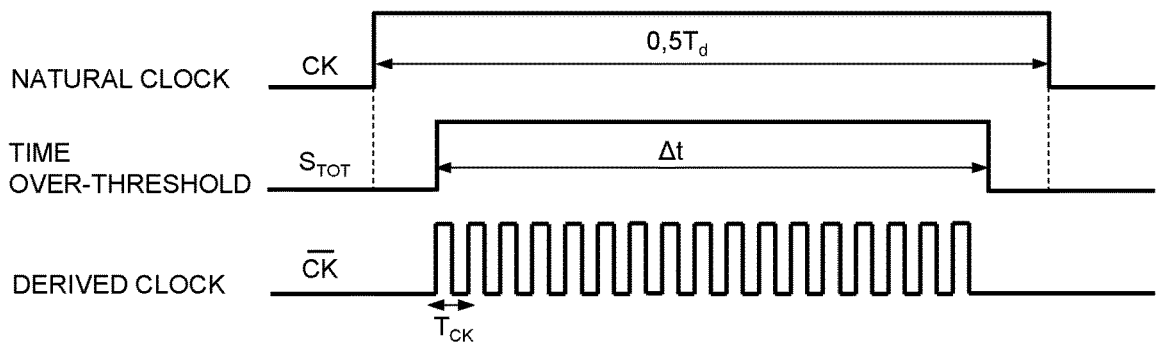
FIG. 8 shows further plots of electrical quantities in the driving circuit.

In this regard, FIG. 8 shows, for a single half-cycle of the natural clock signal ck: a semi-period of oscillation $T_d$; the time-over-threshold signal $S_{ToT}$; and the derived clock signal $\overline{ck}$ at the appropriate frequency $f_{ck}$, windowed by the time-over-threshold signal, the number of cycles of which determines the count N for determining the duration of the time interval Δt. From FIG. 8, it is clear that the resolution in the evaluation of the time over-threshold is linked to the frequency $f_{ck}$: the greater the multiplicative factor k, the shorter the period $T_{ck}$ of the derived clock signal $\overline{ck}$ and thus the better the resolution measurement, or, in other words, the lower the quantization error introduced by the digital measurement of time interval Δt.

The driving circuit 20 further comprises a control stage 26, including, in this case, a digital-to-analog converter (DAC) block 27, which receives at its input the count N to determine the control signal $V_{ctrl}$ for the forcing stage 19. In particular, the control stage 26 is configured to determine the control signal $V_{ctrl}$ based on the oscillation amplitude $A_0$ (measured by the previous expression that uniquely links the oscillation amplitude $A_0$ to the count N) and the amplitude threshold $A_{th}$.

Figure 9:
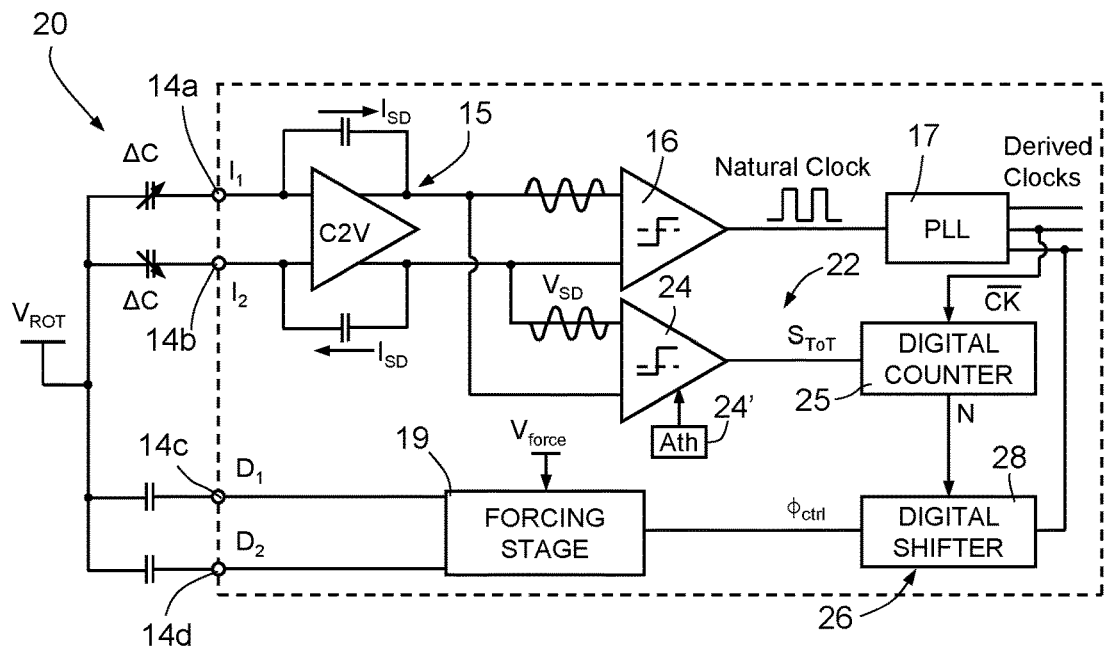
FIG. 9 is a block diagram of the driving circuit of the MEMS gyroscope according to a further embodiment.

As illustrated in FIG. 9, a further embodiment may envisage that forcing, i.e., the generation of the drive signals $D_1$, $D_2$, and the corresponding driving feedback-control, are implemented by regulating the phase of the forcing signal maintaining the amplitude constant, instead of by regulating the amplitude as in the case of the previous embodiment.

In this regard, a phase-control technique for a MEMS gyroscope is, for example, described in "Controlling the primary mode of gyroscopes with a phase-based amplitude regulation", T. Northemann, et al., 2011 Proceedings of the ESSCIRC (ESSCIRC), Sep. 12-16, 2011, pp. 295-298.

In this embodiment, the control stage, once again designated by 26, instead of supplying at its output the analog control signal $V_{ctrl}$ for the forcing stage 19, i.e., an amplitude-control signal, is configured to implement a digital shifter 28, which supplies at its output a properly delayed version (delayed clock $\Phi_{ctrl}$) of the input clock signal $\overline{ck}$, where the delay is determined by the count N; the digital shifter 28 also receives a suitable derived clock signal $\overline{ck}$ from the PLL stage 17.

The forcing stage 19 receives the delayed clock $\Phi_{ctrl}$ and, in this case, a forcing amplitude signal $V_{force}$, having a pre-set value, for appropriately generating the phase of the drive signals $D_1$, $D_2$, which in this case have a constant amplitude.

The above control solution has the advantage of not using a digital-to-analog conversion in the control stage 26, which implements in fact forcing regulation in the digital domain, thus proving even more robust in regard to possible process spread or variations of the operating conditions.

The advantages of the solution proposed are clear from the foregoing description.

In any case, it is once again emphasized that the solution described is based on a digital processing of the input signal to obtain the information on the oscillation amplitude of the driving mode, on which the driving feedback-control is based.

In particular, apart from the threshold-comparator block 24 and the threshold-reference block 24' that supplies the static reference that defines the amplitude threshold $A_{th}$ (where these blocks may in any case be conveniently designed and implemented, as regards the corresponding stability and immunity to noise), this solution does not require analog processing blocks, as is instead required in a customary AGC stage.

Second-order effects deriving from the drift of the analog values of the parameters (such as bandwidth and gain) are in this way eliminated or markedly reduced.

Furthermore, the robustness to temperature variations or to other environmental conditions and to ageing effects is increased, and measurement of the oscillation amplitude is less susceptible to noise on the input signal.

The solution described entails a lower current consumption as compared to traditional solutions of a totally analog type, where a considerable electrical consumption is used to limit the effects of the noise on the output measurement and to guarantee an adequate gain of the stages within the architecture.

Further, the present Applicant has found that the solution proposed is robust also with respect to any offset on the value of the amplitude threshold $A_{th}$ used by the comparator block 24, since known circuit techniques may be implemented to eliminate the effects of the offset.

For instance, in a per se known manner, the chopping technique may be used in the comparator block 24 (a technique envisaging high-frequency modulation of the input signal and subsequent demodulation by filtering) in order to reduce to substantially negligible levels the effects of the comparator offset.

It is further emphasized that the appropriate choice of the operating point of the comparator stage 24 enables the comparison with the amplitude threshold $A_{th}$ to be made in an area of the drive signal $V_{SD}$ having a steep slope, with the advantages that will be clear to a person skilled in the sector.

Figure 10:
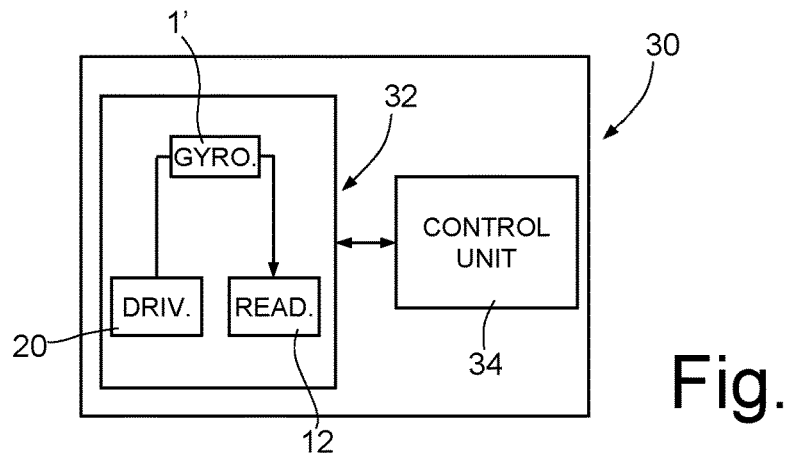
FIG. 10 is a general block diagram of an electronic device in which the MEMS gyroscope is used according to a further aspect of the present application.

Basically, the aforesaid characteristics make the resulting MEMS gyroscope particularly suitable for integration in an electronic device 30, as shown schematically in FIG. 10; the electronic device 20 may be used in a plurality of electronic systems, for example in inertial navigation systems, in automotive systems, or in systems of a portable type, such as a PDA (Personal Digital Assistant), a portable computer, a mobile phone, a digital audio player, and a photographic or video camera, the electronic device 30 being generally capable of processing, storing, transmitting, and receiving signals and information.

The electronic device 30 comprises: the MEMS gyroscope, here designated by 32, provided in particular with the driving circuit 20 configured to drive the mobile driving mass thereof; and an electronic control unit 34, for example a microprocessor, a microcontroller, or a similar computing unit, which is connected to the driving circuit 20 and to the reading circuit 12 of the MEMS gyroscope 32, from which it receives the output voltage $V_{out}$, and is configured to supervise general operation of the electronic device 30, also on the basis of the aforesaid output voltage $V_{out}$, indicative of the detected angular velocity.

Finally, it is clear that modifications and variations may be made to what has been described and illustrated herein, without thereby departing from the scope of the present invention.

In general, it is emphasized that the present solution may be applied, obtaining similar advantages, also with different control strategies and different forcing approaches of the micromechanical structure of the MEMS gyroscope (even different from what has been illustrated previously), which employ in any case a measurement of the oscillation amplitude of the driving movement.

In particular, the control stage 26 of the driving circuit 20 could implement a different solution for control of the forcing stage 19 configured to supply the drive signals $D_1$, $D_2$ for the micromechanical structure of the MEMS gyroscope.

Furthermore, in the case where the input stage 15 supplies at its output two differential drive signals, the comparator block 24 may also be of a differential type, using two amplitude thresholds, a negative one and a positive one, for determining the time over-threshold, in a way that is otherwise altogether similar to what has been previously illustrated.

Figure 1:
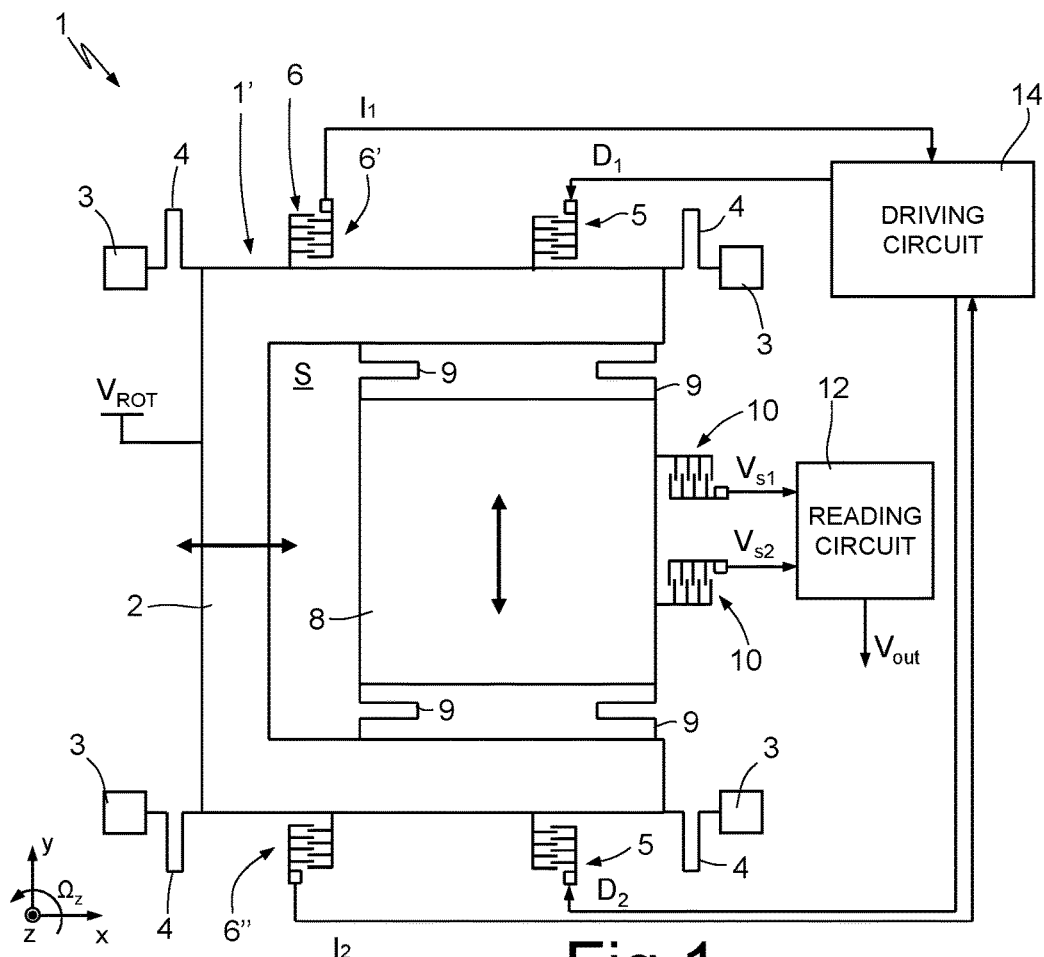
FIG. 1 shows a schematic and simplified representation of a MEMS gyroscope, of a known type, and of the corresponding micromechanical structure.

Finally, it is emphasized that the driving circuit 20 may advantageously be used with any configuration of the micromechanical structure of the MEMS gyroscope, in order to supply the biasing signals for driving a corresponding mobile driving mass. In particular, it is underlined in this regard that what illustrated in FIG. 1 represents only a non-limiting exemplary embodiment of a possible micromechanical structure. For instance, in the micromechanical structure of the MEMS gyroscope a single mobile mass could be present, elastically supported above the substrate, so as to perform both the driving movement and the sensing movement as a result of the resulting Coriolis forces through one and the same mobile mass.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving circuit, comprising:
a measurement stage configured to:
receive a signal representative of a movement of a microelectromechanical system (MEMS) mobile mass; and
determine an oscillation amplitude of the movement of the MEMS mobile mass based on a number of periods of a clock signal that are in a duration of a time interval in which an amplitude of the signal satisfies an amplitude criterion; and
a control stage configured to generate at least one drive signal for the MEMS mobile mass based on the oscillation amplitude, and output the at least one drive signal for driving the MEMS mobile mass at an oscillation frequency.

2. The driving circuit according to claim 1, wherein the measurement stage is configured to:
generate the clock signal based on the oscillation frequency.

3. The driving circuit according to claim 2, wherein the measurement stage is configured to:
determine the duration of the time interval in which the signal satisfies the amplitude criterion.

4. The driving circuit according to claim 1, wherein the number of periods of the clock signal that are in the duration of the time interval is determined as:

$$N = \frac{\Delta t}{T_{ck}} = \frac{f_{ck}}{f_d}\left[\frac{1}{2} - \frac{1}{\pi}\sin^{-1}\left(\frac{A_{th}}{A_0}\right)\right] = k\left[\frac{1}{2} - \frac{1}{\pi}\sin^{-1}\left(\frac{A_{th}}{A_0}\right)\right],$$

wherein $\Delta t$ is the duration of the time interval, $T_{ck}$ is a period of the clock signal, $f_{ck}$ is a frequency of the clock signal, $f_d$ is the oscillation frequency, k is a factor, and $A_{th}/A_0$ is a ratio of an amplitude threshold of the amplitude criterion and the oscillation amplitude.

5. The driving circuit according to claim 1, wherein the measurement stage includes:
a threshold-comparator block configured to compare the signal with an amplitude threshold, and generate a time-over-threshold signal indicative of the duration of the time interval during which an absolute value of the signal is above the amplitude threshold; and
a counter block configured to determine the number of periods of the clock signal based on the time-over-threshold signal.

6. The driving circuit according to claim 2, wherein the control stage includes:
a digital-to-analog converter configured to compare the oscillation amplitude with a reference value representing a desired oscillation amplitude of the movement of the MEMS mobile mass, and generate a control signal based on comparing the oscillation amplitude with the reference value and output the control signal.

7. The driving circuit according to claim 1, wherein the control stage includes:
a digital shifter configured to receive the number of periods of the clock signal, generate, based on the number of periods of the clock signal, a delayed clock signal, and output the delayed clock signal.

8. The driving circuit according to claim 5, wherein the absolute value of the amplitude threshold is greater than zero and less than an absolute value of the oscillation amplitude.

9. A microelectromechanical system (MEMS) device, comprising:
a mobile mass; and
a driving circuit including:
a measurement stage configured to:
receive a signal representative of a movement of the mobile mass; and
determine an oscillation amplitude of the movement of the mobile mass based on a number of periods of a clock signal that are in a duration of a time interval in which an amplitude of the signal satisfies an amplitude criterion; and
a control stage configured to generate at least one drive signal for the mobile mass based on the oscillation amplitude, and output the at least one drive signal for driving the mobile mass at an oscillation frequency.

10. The MEMS device according to claim 9, wherein the measurement stage is configured to:
generate the clock signal based on the oscillation frequency.

11. The MEMS device according to claim 10, wherein the measurement stage is configured to:
determine the duration of the time interval in which the signal satisfies the amplitude criterion.

12. The MEMS device according to claim 9, wherein the number of periods of the clock signal that are in the duration of the time interval is determined as:

$$N = \frac{\Delta t}{T_{ck}} = \frac{f_{ck}}{f_d}\left[\frac{1}{2} - \frac{1}{\pi}\sin^{-1}\left(\frac{A_{th}}{A_0}\right)\right] = k\left[\frac{1}{2} - \frac{1}{\pi}\sin^{-1}\left(\frac{A_{th}}{A_0}\right)\right],$$

wherein $\Delta t$ is the duration of the time interval, $T_{ck}$ is a period of the clock signal, $f_{ck}$ is a frequency of the clock signal, $f_d$ is the oscillation frequency, k is a factor, and $A_{th}/A_0$ is a ratio of an amplitude threshold of the amplitude criterion and the oscillation amplitude.

13. The MEMS device according to claim 9, wherein the measurement stage includes:
a threshold-comparator block configured to compare the signal with an amplitude threshold, and generate a time-over-threshold signal indicative of the duration of the time interval during which an absolute value of the signal is above the amplitude threshold; and
a counter block configured to determine the number of periods of the clock signal based on the time-over-threshold signal.

14. The MEMS device according to claim 10, wherein the control stage includes:
a digital-to-analog converter configured to compare the oscillation amplitude with a reference value representing a desired oscillation amplitude of the movement of the mobile mass, and generate a control signal based on comparing the oscillation amplitude with the reference value and output the control signal.

15. The MEMS device according to claim 9, wherein the control stage includes:
a digital shifter configured to receive the number of periods of the clock signal, generate, based on the number of periods of the clock signal, a delayed clock signal, and output the delayed clock signal.

16. A method, comprising:
receiving a signal representative of a movement of a microelectromechanical system (MEMS) mobile mass;
determining an oscillation amplitude of the movement of the MEMS mobile mass based on a number of periods of a clock signal that are in a duration of a time interval in which an amplitude of the signal satisfies an amplitude criterion;
generating at least one drive signal for the MEMS mobile mass based on the oscillation amplitude; and
outputting the at least one drive signal for driving the MEMS mobile mass at an oscillation frequency.

17. The method according to claim 16, comprising:
generate the clock signal based on the oscillation frequency.

18. The method according to claim 16, comprising:
determining the duration of the time interval in which the signal satisfies the amplitude criterion.

* * * * *